UNITED STATES PATENT OFFICE 1,981,242

DYESTUFF MIXTURE

Joachim Mueller, Ludwigshafen-on-the-Rhine, Germany, assignor to General Aniline Works, Inc., New York, N. Y., a corporation of Delaware No Drawing. Application November 29, 1932, Serial No. 644,917. In Germany December 5, 1931

8 Claims. (Cl. 8—6)

The present invention relates to mixtures of vat dyestuffs yielding dyeings and printings of excellent fastness properties.

It is already known that dyeings on textiles of all kinds produced from mixtures of dyestuffs readily undergo changes by exposure to light and other influences which are due to the changes, for example by fading, of the less fast component of the mixture. Sometimes it is even observed that the fastness properties of the faster component are detrimentally affected by the less fast component.

I have now found that mixtures of at least two vat dyestuffs at least one of which contains the ring system:

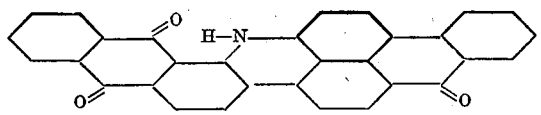

give rise to dyeings and printings which are distinguished by very good fastness properties, in particular as regards fastness to light and atmospheric influences on fibres of vegetable origin including artificial silk and on silk.

The dyestuffs containing the said ring system exert a protecting action on the dyestuffs admixed therewith, i. e. they increase the fastness to light of these dyestuffs. This is the case in all dyestuff mixtures containing at least 10 to 15 per cent of the dyestuffs containing the said ring system. If the admixed dyestuff is by far preponderating in the dyestuff mixtures, the latter are substantially faster to light than other vat dyestuffs of similar shades especially in those cases in which the admixed dyestuffs dye yellow to reddish violet shades. It is a well known fact that generally in dyeings produced by mixtures of about 95 to 98 per cent of a dyestuff giving yellow to reddish-violet shades with 5 to 1 per cent of a dyestuff giving shades of greater depth of color (blue, green, olive and the like) the latter components fade relatively rapidly even when they give relatively fast dyeings when employed alone. In contrast to this the corresponding dyestuff mixtures according to the present invention have a considerable fastness to light. The vat dyestuffs containing the ring system indicated above may amount to between 10 per cent and 98 per cent of the dyestuff mixture.

The absolute degree of the protecting action exerted by the dyestuffs containing the ring system shown above depends, of course, on the percentage of the said components in the dyestuff mixtures. The optimum of the said action is practically attained at a content of about 40 per cent of the said components and a further increase thereof causes only a slight further improvement.

The dyestuffs containing the ring system indicated above may be produced by condensing halogenated benzanthrones with aminoanthraquinones or derivatives of the said materials and closing the ring containing the nitrogen atom by treatment with condensing agents, the products thus obtained being subjected to a further treatment, if desired; processes for the production of dyestuffs of the said kind are described for example in the U. S. Patents No. 995,936, 1,845,469, 1,850,562 and the German Patent No. 533,500. Dyestuffs of the type in question may also be prepared by condensing a halogen derivative of a compound corresponding to the general formula

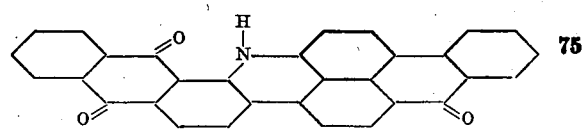

with a primary aromatic amine, preferably a primary aromatic amine capable of being vatted such as an aminoanthraquinone or an aminobenzoylaminoanthraquinone. The said dyestuffs usually give dyeings of olive green to grey shades when dyed alone.

The other components of the dyestuff-mixtures may be selected from the entire field of vat dyestuffs giving dyeings of any desired shade varying from yellow to black. Suitable dyestuffs of this kind are for example Hydron Yellow G (Schultz, Farbstofftabellen, 7th edition (1931), vol. 1, No. 1286), Indanthren Golden Orange G (Schultz, Farbstofftabellen, 7th edition (1931), vol. 1, No. 1245), Brilliant Indigo BASF, 4B (Schultz, Farbstofftabellen, 7th edition (1931), vol. 1, No. 1314), Indanthren Brilliant Violet BBK (Schultz, Farbstofftabellen, 7th edition (1931), vol. 1, No. 1222), Hydron Blue R (Schultz, Farbstofftabellen, 7th edition (1931), vol. 1, No. 1111), Indanthren Olive R (Schultz, Farbstofftabellen, 7th edition (1931), vol. 1, No. 1224) and the dyestuffs obtainable according to U. S. Patent No. 1,748,240.

The dyestuff mixtures may be prepared in any desired form, for example as powders or pastes, if desired with the usual additions. The dyestuff mixtures may consist of two or more components; one or more vat dyestuffs containing the ring system indicated above may be mixed with one or more other vat dyestuffs.

The following examples will further illustrate how the said invention may be carried out in practice, but the invention is not restricted to these examples. The parts are by weight. Numerous dyestuffs mentioned in the examples are identified by citing the corresponding number in "Schultz, Farbstofftabellen, 7th edition (1931), vol. 1". The abbreviated quotations "Schultz, 7th edition, No. " will be used to indicate the said publication.

Example 1

5 parts of the olive green vat dyestuff prepared according to Example 2 of the U. S. Patent No. 995,936 are vatted together with 10 parts of Indanthren Yellow GF (Schultz, 7th ed. No. 1286) with the addition of 50 parts of caustic soda and 15 parts of hydrosulphite in 10,000 parts of water at 60° C in the usual manner. 500 parts of cotton are dyed in this vat for one hour. The material is then rinsed and oxidized in the air. A dyeing of vivid green shade of high fastness to light and to the influence of the atmosphere is obtained; the yellow therein is still substantially faster than when it is used alone for dyeing.

If 5 parts of the aforesaid olive green vat dyestuff are used together with 12 parts of Algol Yellow GC (Schultz, 7th edition, No. 1249) while working under otherwise the same conditions as indicated above, also dyeings of vivid green shade of high fastness are obtained.

Example 2

7 parts of the olive green vat dyestuff (obtained by brominating the green dyestuff obtainable according to Example 1 of Patent No. 995,936 with its own weight of bromine in aqueous suspension at temperatures rising from 20° to 95° C. and boiling 8 parts of the brominated product with 6 parts of α-aminoanthraquinone in 150 parts of naphthalene in the presence of 4 parts of calcined soda and 0.3 part of copper oxide) are vatted together with 3 parts of Indanthren Brilliant Pink R (Schultz, 7th ed. No. 1345) in the manner described in Example 1. If cotton be dyed from this vat in the manner described in Example 1 reddish-grey shades of very high fastness are obtained. If Indanthren Brilliant Pink R be used alone for producing a dyeing in the depth of color indicated above its fastness is substantially inferior to its fastness in the grey dyeing obtained when working as already stated.

Example 3

3.5 parts of the olive-green vat dyestuff obtained according to the second example of the Patent No. 995,936 are vatted together with 10 parts of Brilliant Indigo 4B (Schultz, 7th ed., No. 1314) with the addition of 25 parts of caustic soda and 15 parts of hydrosulphite in 10,000 parts of water at 40° to 50° C. 500 parts of cotton are dyed from this vat at 40° to 45° C. After half an hour 100 parts of Glauber's salt, and after another quarter of an hour a further 100 parts of the said salt, are added. When the dyeing has continued for 1¼ hours, the dyed material is further treated as described in Example 1. The dyeing may also be carried out without the addition of Glauber's salt but in this case the productivity of the dyestuff is not so high. Brilliant Indigo 4B, which as such is not so very fast to light, is much faster when dyed in the said manner in admixture with a dyestuff according to the present invention.

Further examples are given in the following table. Column 1 contains the quantity, column 2 the nature of the dyestuff which according to the present invention imparts the valuable properties to the dyestuff mixture. In column 3 the quantity and in column 4 the nature of the admixed dyestuff is given. In column 5 it is stated according to which example the dyeing of the said mixture is preferably carried out.

The quantities are suitable for preparing 10 litres of vat.

| 1. Component | | 2. Component | | Dyed according to Example No. |
|---|---|---|---|---|
| Grams | | Grams | | |
| 0.2 | Olive-green vat dyestuff according to Patent No. 995,936 Example 2 | 0.6 | Yellow vat dyestuff from 1.5-tri-anthrimide according to German specification 251,350. | 1 |
| 0.08 | ----do---- | 0.3 | Orange vat dyestuff from 5.5′-dibenzoylamino-1.1′-dianthrimide according to German specification No. 239,544. | 3 |
| 0.1 | ----do---- | 0.5 | Brown vat dyestuff according to German specification 465,835 and | 3 |
| | | 0.1 | Orange vat dyestuff from 5.5′-dibenzoylamino - 1.1′-dianthrimide. | |
| 3.75 | ----do---- | 4 | Algol Orange RF (Schultz, 7th ed. No. 1349). | 1 |
| 1.45 | ----do---- | 12 | ----do---- | 1 |
| 1.8 | ----do---- | 18 | Yellow vat dyestuff according to German specification 469,019, Example 2. | 3 |
| 3 | ----do---- | 3.5 | Indanthren Red - Violet RH (Schultz, 7th ed. No. 1354). | 1 |
| 2 | Olive-green vat dyestuff according to Patent No. 995,936, Example 2. | 3 | Indanthren Yellow GF (Schultz, 7th ed. No. 1286). | 1 |
| 3.5 | Olive vat dyestuff according to Patent No. 1,845,469 Example 1. | 1.5 | Indanthren Yellow GF (Schultz, 7th ed. No. 1286). | 1 |
| 3.5 | ----do---- | 5 | Indanthren Gold-Orange G (Schultz, 7th ed. No. 1245). | 1 |
| 2.5 | Olive - green vat dyestuff according to Patent No. 995,936 Example 2. | 10 | Anthra red RT (Schultz, 7th ed. No. 1254). | 3 |
| 5 | ----do---- | 7.5 | Indanthren Brilliant Violet RR (Schultz, 7th ed. No. 1265). | 1 |
| 3 | Grey vat dyestuff according to Patent No. 1,845,469. | 3 | Indanthren Brilliant Pink R (Schultz, 7th ed. No. 1345). | 1 |
| 2.5 | Olive - green vat dyestuff according to Patent No. 995,936 Example 2. | 7.5 | Indanthren Currant RK (Schultz, 7th ed. No. 1226). | 3 |
| 0.5 | ----do---- | 4.5 | Indanthren Brown R (Schultz, 7th ed. No. 1227). | 3 |
| 0.6 | ----do---- | 5 | Indanthren Orange RRK (Schultz, 7th ed. No. 1225). | 3 |
| 2 | ----do---- | 6 | Indanthren Brilliant Pink R (Schultz, 7th ed. No. 1345). | 1 |
| 1.45 | ----do---- | 4.5 | Vat dyestuff according to German specification 448,286, Example 2. | 3 |
| 0.4 | Olive - green vat dyestuff according to Patent No. 995,936 Example 2. | 2.3 | Indanthren Brown R (Schultz, 7th ed. No. 1227) and | 3 |
| | | 2.5 | Indanthren Olive R (Schultz, 7th ed. No. 1224). | |
| 5 | ----do---- | 10 | Hydron Blue B (Schultz, 7th ed. No. 1113). | 3 |

| 1. Component | | 2. Component | | Dyed according to Example No. |
|---|---|---|---|---|
| *Grams* | | *Grams* | | |
| 4 | ....do....... | 7.5 | Brown vat dyestuff from β-naphthylamine according to German specification 241,910. | 1 |
| 3.5 | Olive-green vat dyestuff according to Patent No. 995,936 Example 2. | 4.8 | Yellow vat dyestuff from 1.5-trianthrimide according to German specification 251,350. | 3 |
| 2.7 | ....do....... | 3.2 | Blue vat dyestuff according to German specification 287,615, Example 1. | 3 |
| 4.5 | ....do....... | 7.5 | Black vat dyestuff according to German specification 399,909, Example 5. | 3 |
| 15 | Vat dyestuff obtained by boiling for 5 hours 10 parts of the vat dyestuff prepared according to Example 2 of Patent 995,936 in 150 parts of trichlorbenzene with 0.2 part of iodine and 20 parts of sulphur chloride. | 6 | Indanthren Brilliant Pink R (Schultz, 7th ed. No. 1345). | 1 |

What I claim is:

1. Dyestuff mixtures giving dyeings of very good fastness properties comprising a vat-dyestuff containing the ring system

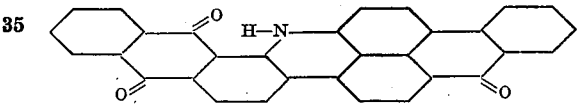

and a vat-dyestuff free from said ring system.

2. Dyestuff mixtures giving dyeings of very good fastness properties comprising a vat-dyestuff containing the ring system

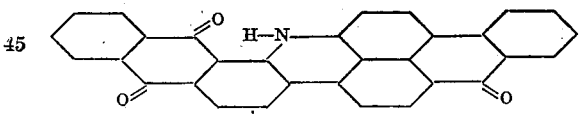

and a vat-dyestuff free from said ring system, the former being present in an amount of between 10 and 98 per cent, by weight, of the dyestuff mixture.

3. Dyestuff mixtures giving dyeings of very good fastness properties comprising between 10 and 98 per cent, by weight, of the vat-dyestuff corresponding to the formula

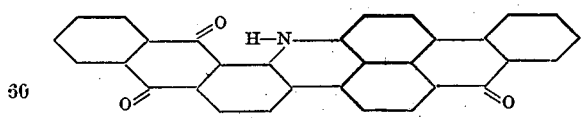

and between 90 and 2 per cent, by weight, of a vat dyestuff free from the said ring system.

4. Dyestuff mixtures giving dyeings of very good fastness properties comprising between 10 and 98 per cent, by weight of the vat dyestuff corresponding to the formula:

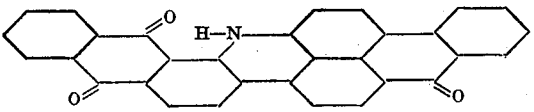

and between 90 and 2 per cent, by weight, of Indanthren Yellow GF (Schultz, Farbstofftabellen, 7th edition (1931), vol. 1, No. 1286).

5. A dyestuff mixture comprising about 5 parts, by weight, of the vat dyestuff corresponding to the formula:

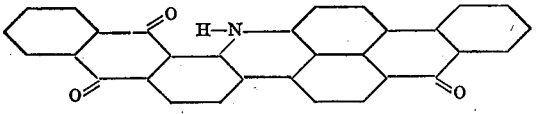

and about 10 parts, by weight, of Indanthren Yellow GF (Schultz, Farbstofftabellen, 7th edition (1931), vol. 1, No. 1286), dyeing cotton vivid green shades of high fastness to light and to the influence of the atmosphere.

6. Dyestuff mixtures giving dyeings of very good fastness properties comprising between 10 and 98 per cent, by weight, of the vat dyestuff corresponding to the formula:

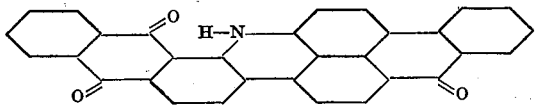

and between 90 and 2 per cent, by weight, of Algol Yellow GC (Schultz, Farbstofftabellen, 7th edition (1931), vol. 1, No. 1249).

7. A dyestuff mixture comprising about 5 parts, by weight, of the vat dyestuff corresponding to the formula:

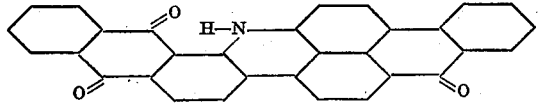

and about 12 parts, by weight, of Algol Yellow GC (Schultz, Farbstofftabellen, 7th edition (1931), vol. 1, No. 1249), dyeing cotton vivid green shades of high fastness to light and to the influence of the atmosphere.

8. Dyestuff mixtures giving dyeings of very good fastness properties comprising the vat dyestuff corresponding to the formula:

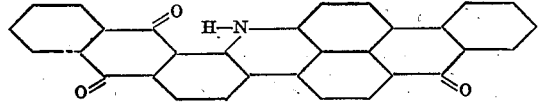

and a vat dyestuff dyeing from yellow to orange shades, the former being present in an amount of between 10 and 98 per cent, by weight, of the dyestuff mixture.

JOACHIM MUELLER.